UNITED STATES PATENT OFFICE.

CHARLES FLEISCHMANN, OF CINCINNATI, OHIO, ASSIGNEE OF EUSEBIUS BRUUN, DECEASED.

PREPARING PRESSED YEAST.

SPECIFICATION forming part of Reissued Letters Patent No. 11,550, dated June 30, 1896.

Original No. 439,834, dated November 4, 1890. Application for reissue filed March 6, 1896. Serial No. 582,149.

*To all whom it may concern:*

Be it known that EUSEBIUS BRUUN, now deceased, a subject of the King of Denmark, in his lifetime residing at Svendborg, in Denmark, having invented certain new and useful Improvements in the Manufacture of Yeast, did obtain Letters Patent of the United States therefor, No. 439,834, dated November 4, 1890, which said invention and Letters Patent were subsequently assigned to me, Charles Fleischmann, a citizen of the United States, residing at Cincinnati, in the county of Hamilton and State of Ohio; and I do hereby declare the following to be a full, clear, and exact description of the invention, such as will enable others skilled in the art to which it appertains to make and use the same.

The process has for its object the production of pressed yeast of best quality—that is to say, with the best color, greatest possible leavening power, and durability—and this, too, in such quantities that it allows of the simultaneous manufacture of spirits, though the spirits can be entirely dispensed with or reduced to such a small quantity that, as compared with the quantity of yeast produced, it becomes an additional or secondary product, and yet with much greater pecuniary advantage than by the old method, in which the spirits was the main and the yeast the secondary product.

As raw material all kinds of grain can be used, governed by the local prices, with or without adding malt germs, wheat-bran, or other substances containing nitrogen. The main substance—seventy-five per cent. of the raw material—is taken from barley, rye, or maize, according to the local prices, and is washed, malted, and ground. Five per cent. is taken of barley or buckwheat, and twenty per cent. of rye or maize; but these twenty-five per cent. are used in unmalted state, but washed, so as to remove the coloring substance of the outside portions of the raw material, and then soaked sufficiently to soften the grain, so that it can be ground like green malt on an ordinary malt-mill with two rollers. The thus-divided grain is left soaking in water with a slight amount of muriatic acid for twenty-four hours, that is, the seventy-five per cent. of malted grain, properly ground, and the twenty-five per cent. of unmalted grain, separately ground, are mixed together in an ordinary mash-tun, and cold water being added in sufficient quantity to cover the mixture, it is left soaking in the water with the muriatic acid added for twenty-four hours for peptonizing, that is, for making the albuminous substances assimilable, and is then left in the ordinary manner for the formation of maltose, that is, the peptonized material while being agitated has its temperature raised to about 58° to 60° Celsius by introducing hot water or steam during a period of about three-quarters of an hour and is left covered without further agitation for about an hour and a half for the complete conversion into maltose. The material is then subjected to various treatments, such as filtration through its own husks, and subsequent passage through a system of sieves of different mesh—that is, the liquid or wort below the usual perforated bottom of the mash-tun is drawn off and conducted back into the mash, to be again passed through the same until the wort shows clear, and is then caused to pass through sieves of different mesh, increasing in fineness from first to last, say No. 8, No. 10, and No. 12—and is then either conveyed direct to the fermenting-chambers, or, if a yeast of a brighter color is desired, is subjected to a further filtration, either through bone-black by the aid of steam-pressure, or through silicious earth or other similar inorganic substances, whereby is obtained an almost colorless fluid of about ten per cent. saccharometer. If too high, its gravity may be reduced to about ten per cent. by adding water. This fluid should have a temperature of 30° Celsius, to which it is reduced by cooling. Yeast (compressed yeast) is then added in about the proportion of one and one-half pounds of yeast to about one hundred gallons of liquid, and partly by cooling and partly by the addition of steam this temperature of about 30° Celsius is sustained through the whole period of fermentation, which is advanced by the introduction of air, (by the use of fermenting vessels fitted with ventilating appliances or means for introducing air,) whereby the fermentation is completed in about ten hours. As added yeast, ordinary yeast is used, dissolved in water at 30° Celsius. After fermentation is finished, the yeast is separated from the fermented fluid either by precipitation or by the use of a centrifugal machine, and is then cleaned and pressed as usual. If a simultaneous production of spirits be w nted, this is attained in the usual manner by distilling the fluid which remains after precipitation or the centrifugal process.

In hot weather, when the process has been practiced for a considerable length of time, the air and the vessels containing the material under treatment will become impregnated with bacteria of lactic acid during the time the ground grain is left soaking in water for peptonizing, and in subsequent operations this bacteria of lactic acid will act upon the grain under treatment, rendering the same sour and producing an additional amount of lactic acid sufficient for the purposes of peptonizing without necessitating the addition of muriatic or other inorganic acids, so that under such conditions the use of inorganic acids may be dispensed with.

Having thus fully described the invention, what is claimed as new, and desired to be secured by Letters Patent of the United States, is—

1. A process for the manufacture of pressed yeast, which consists in subjecting the greater portion of the material from which the yeast is to be produced to a washing and malting process and the smaller portion to a washing and moistening only, after which such larger and smaller portions of grain are ground separately and then mixed with water, with the addition of inorganic acids, and left standing, for the purpose of peptonizing; then raising the temperature of the mash for the formation of maltose, after which the mash is filtered and the filtered substance placed in a fermenting vessel and fermented with the addition of yeast; introducing air during the fermenting process; sustaining the liquid at a constant temperature during fermentation; and finally separating the yeast from the wort, substantially as described.

2. A process for the manufacture of pressed yeast consisting in subjecting the greater portion of the material (grain, residue of grain, bran and malt germs) from which the yeast is to be produced to a washing and malting process, and the smaller portion to a washing and moistening only, (the coloring substance of the outside portions of the raw materials being removed by washing,) after which the malted and moistened grain is ground separately and then mixed with water and left standing for the purpose of peptonizing; then raising the temperature of the mash for the formation of maltose; then filtering the mash through a series of sieves increasing in fineness, or through a suitable inorganic substance, as bone-black or the like; then placing the filtered substance in a fermenting vessel and adding yeast to produce fermentation; introducing air during the fermenting process; sustaining the mash at a constant temperature during fermentation; and finally separating the yeast from the wort by precipitation or centrifugal separation, substantially as described.

3. A process for the manufacture of pressed yeast, consisting in subjecting the greater portion of the material (grain, residue of grain, bran, and malt germs) from which the yeast is to be produced to a washing and malting process and the smaller portion to only a washing and moistening, (the coloring substance of the outside portions of the raw materials being removed by washing,) after which the two portions of moistened grain are ground and mixed with water, and left standing, with the addition of inorganic acids, for the purpose of peptonizing, then steamed and transformed to maltose, after which the mash is filtered through a series of sieves, increasing in fineness, or a suitable inorganic substance, as bone-black or the like, and the filtered substance placed in a fermenting vessel fitted with ventilating appliances, where it is kept at a constant temperature during fermentation, and finally separating the yeast, which has been formed, from the wort, by precipitation or centrifugal separation, substantially as described.

In testimony whereof I affix my signature in the presence of two witnesses.

CHARLES FLEISCHMANN,
*Assignee of Eusebius Brunn, deceased.*

Witnesses:
JULIUS FLEISCHMANN,
GEORGE W. BROWN.